(12) United States Patent
Mishima

(10) Patent No.: US 11,361,906 B2
(45) Date of Patent: Jun. 14, 2022

(54) MULTILAYER CERAMIC ELECTRONIC COMPONENT

(71) Applicant: Murata Manufacturing Co., Ltd., Nagaokakyo (JP)

(72) Inventor: Yasuhiro Mishima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 35 days.

(21) Appl. No.: 16/995,856

(22) Filed: Aug. 18, 2020

(65) Prior Publication Data

US 2021/0098193 A1 Apr. 1, 2021

(30) Foreign Application Priority Data

Sep. 26, 2019 (JP) .............................. JP2019-175159

(51) Int. Cl.
| | |
|---|---|
| *H01G 4/30* | (2006.01) |
| *H01G 4/012* | (2006.01) |
| *H01G 2/06* | (2006.01) |
| *H01G 4/12* | (2006.01) |
| *H01G 4/008* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ........... H01G 4/30; H01G 4/12; H01G 4/248; H01G 4/012; H01G 4/1209; H01G 4/232; H01G 4/1227; H01G 4/2325; H01G 4/0085; H01G 4/224; H01G 2/065; H01G 4/008; H01G 4/1218
See application file for complete search history.

(56) References Cited

U.S. PATENT DOCUMENTS

| | | | | |
|---|---|---|---|---|
| 5,339,068 A | * | 8/1994 | Tsunoda .................... | H01C 1/02 338/308 |
| 9,373,446 B2 | * | 6/2016 | Park ......................... | H01G 4/30 |
| 10,366,834 B1 | * | 7/2019 | Lee .......................... | H01G 4/30 |

(Continued)

FOREIGN PATENT DOCUMENTS

| | | |
|---|---|---|
| JP | 11-162771 A | 6/1999 |
| JP | 2017-130572 A | 7/2017 |
| JP | 2018-088451 A | 6/2018 |

*Primary Examiner* — Michael P Mcfadden
(74) *Attorney, Agent, or Firm* — Keating & Bennett, LLP

(57) ABSTRACT

A multilayer ceramic electronic component includes a stacked body and external electrodes provided on two end surfaces of the stacked body. Each external electrode includes an underlying electrode layer including a conductive metal, a resin electrode layer including a resin and metal component, a resin layer including a resin and no metal component, and a metal layer. The underlying electrode layers extend from the two end surfaces to cover a portion of two main surfaces and two lateral surfaces. The resin electrode layers cover the underlying electrode layers provided on the two end surfaces. The resin layers are connected to the resin electrode layers and provided on the underlying electrode layers located on a portion of the two main surfaces and two lateral surfaces. The metal layers cover the surfaces of the resin electrode layers and resin layers.

20 Claims, 5 Drawing Sheets

(56) References Cited

U.S. PATENT DOCUMENTS

| | | | |
|---|---|---|---|
| 2016/0141103 A1* | 5/2016 | Hamanaka | H01G 4/232 |
| | | | 361/301.4 |
| 2017/0076865 A1* | 3/2017 | Tanaka | H01G 4/224 |
| 2018/0151296 A1 | 5/2018 | Yamada | |
| 2018/0337001 A1* | 11/2018 | Tozawa | H01B 1/22 |
| 2019/0385795 A1* | 12/2019 | Yang | H01G 4/2325 |

* cited by examiner

MULTILAYER CERAMIC ELECTRONIC COMPONENT

CROSS REFERENCE TO RELATED APPLICATIONS

This application claims the benefit of priority to Japanese Patent Application No. 2019-175159 filed on Sep. 26, 2019. The entire contents of this application are hereby incorporated herein by reference.

BACKGROUND OF THE INVENTION

1. Field of the Invention

The present invention relates to a multilayer ceramic electronic component, such as a multilayer ceramic capacitor.

2. Description of the Related Art

In recent years, multilayer ceramic electronic components, such as multilayer ceramic capacitors, have been used under a harsher environment than ever.

For example, electronic components for use in mobile devices, such as mobile telephones and portable music players, need to withstand drop impacts. Specifically, a multilayer ceramic electronic component needs to be prevented from falling off a mounting board or cracking when subjected to drop impacts.

Also, multilayer ceramic electronic components for use in on-vehicle devices, such as ECUs, need to withstand shocks from thermal cycling. Specifically, a multilayer ceramic electronic component needs to be prevented from cracking when subjected to tensile stresses applied to the external electrodes or bending stresses due to the thermal expansion and contraction of a mounting board caused by thermal cycling. The stacked body, when subjected to stresses exceeding its strength, will crack.

In view of the above, a technique has been proposed in which a thermosetting conductive resin paste is used for external electrodes of multilayer ceramic electronic components. For example, Japanese Patent Laid-Open No. 11-162771 describes providing an epoxy thermosetting conductive resin layer that includes metallic powder between a conventional underlying electrode layer and Ni plating layer, so as to prevent cracking of a capacitor body (for increasing the resistance to bending), even under a harsh environment.

In a multilayer ceramic electronic component as described in Japanese Patent Laying-Open No. 11-162771 for example, a thermosetting resin layer typically completely covers a baked electrode layer. Such a design provides a fail-safe function to release stresses applied to the multilayer ceramic electronic component. Specifically, when a large bending stress is applied to the substrate, the multilayer ceramic electronic component is designed to produce destructive cracks, starting from an end of the thermosetting resin layer and extending in the thermosetting resin layer, in the interface between the thermosetting resin layer and a nickel plating layer, or in the interface between the thermosetting resin layer and the capacitor body, thus preventing the cracks from extending to the capacitor body.

In the multilayer ceramic electronic component as described in Japanese Patent Laid-Open No. 11-162771, the thermosetting resin layer typically includes Ag or Cu metallic powder. Ag and Cu, however, are elements that easily migrate. Migration may cause electrical connection between the external electrodes on both ends of the multilayer ceramic electronic component, resulting in a short circuit in the multilayer ceramic electronic component.

Migration occurs by the following mechanism. When a voltage is applied to the external electrodes of a multilayer ceramic electronic component, Ag ionizes and water decomposes into ions in the anode. The ionized Ag reacts with hydroxide ions, forming AgOH. AgOH decomposes into silver oxide and colloidally moves to the cathode. The silver oxide ionizes, and emits and receives electrons, forming an Ag deposit.

SUMMARY OF THE INVENTION

Accordingly, preferred embodiments of the present invention provide multilayer ceramic electronic components that each reduce or prevent ion migration and also have resistance to cracking.

A multilayer ceramic electronic component according to a preferred embodiment of the present invention includes a stacked body, a first external electrode, and a second external electrode. The stacked body includes a plurality of ceramic layers and a plurality of internal electrode layers which are stacked. The stacked body also includes a first main surface and a second main surface opposite to each other in the stacking direction, a first end surface and a second end surface opposite to each other in the length direction orthogonal or substantially orthogonal to the stacking direction, and a first lateral surface and a second lateral surface opposite to each other in the width direction orthogonal or substantially orthogonal to the stacking direction and the length direction. The first external electrode is provided on the first end surface. The second external electrode is provided on the second end surface. The first external electrode includes a first underlying electrode layer including a conductive metal, a first resin electrode layer including a resin and metal component, a first resin layer including a resin and no metal component, and a first metal layer including plating. The second external electrode includes a second underlying electrode layer including a conductive metal, a second resin electrode layer including a resin and metal component, a second resin layer including a resin and no metal component, and a second metal layer including plating. The first underlying electrode layer covers the first end surface and extends from the first end surface to cover a portion of each of the first main surface, the second main surface, the first lateral surface, and the second lateral surface. The second underlying electrode layer covers the second end surface and extends from the second end surface to cover a portion of each of the first main surface, the second main surface, the first lateral surface, and the second lateral surface. The first resin electrode layer is provided on the first underlying electrode layer located on the first end surface. The second resin electrode layer is provided on the second underlying electrode layer located on the second end surface. The first resin layer is connected to the first resin electrode layer and is provided on the first underlying electrode layer located on a portion of each of the first main surface, the second main surface, the first lateral surface, and the second lateral surface. The second resin layer is connected to the second resin electrode layer and is provided on the second underlying electrode layer located on a portion of each of the first main surface, the second main surface, the first lateral surface, and the second lateral surface. The first metal layer covers a surface of the first resin electrode layer and a surface of the first resin layer. The second metal layer covers a surface of the second resin electrode layer and a surface of the second resin layer.

In a multilayer ceramic electronic component according to a preferred embodiment of the present invention, the first resin layer is connected to the first resin electrode layer and is provided on the first underlying electrode layer located on a portion of each of the first main surface, the second main surface, the first lateral surface, and the second lateral surface, and the second resin layer is connected to the second resin electrode layer and is provided on the second underlying electrode layer located on a portion of each of the first main surface, the second main surface, the first lateral surface, and the second lateral surface. Thus, in the anode of the external electrodes, the resin layer prevents Ag on the end surface from reacting with hydroxide ions attached to the external electrode. Therefore, AgOH which contributes to migration is not generated.

In the cathode of the external electrodes, the resin layer, which includes no Ag, does not allow electrons to move therein. Therefore, Ag ions, if any, do not cause the deposition of Ag on the first and second main surfaces and on the first and second lateral surfaces and do not form a starting point of an Ag dendrite deposit.

The resin layer also reduces or prevents cracking of the multilayer ceramic electronic component. This is because the resin layer is able to release stresses applied to the mounting board (the deformation of the mounting board) when the multilayer ceramic electronic component is subjected to stresses due to a drop impact or bending stresses due to the thermal expansion and contraction of a mounting board caused by thermal cycling.

Preferred embodiments of the present invention provide multilayer ceramic electronic components that each reduce or prevent ion migration and also have resistance to cracking.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

A multilayer ceramic capacitor will now be described as an example of a multilayer ceramic electronic component according to a preferred embodiment of the present invention. The present preferred embodiment describes a two-terminal capacitor as an example. However, the preferred embodiment is not limited to a two-terminal capacitor, and may also be a multi-terminal capacitor.

Figure 1:
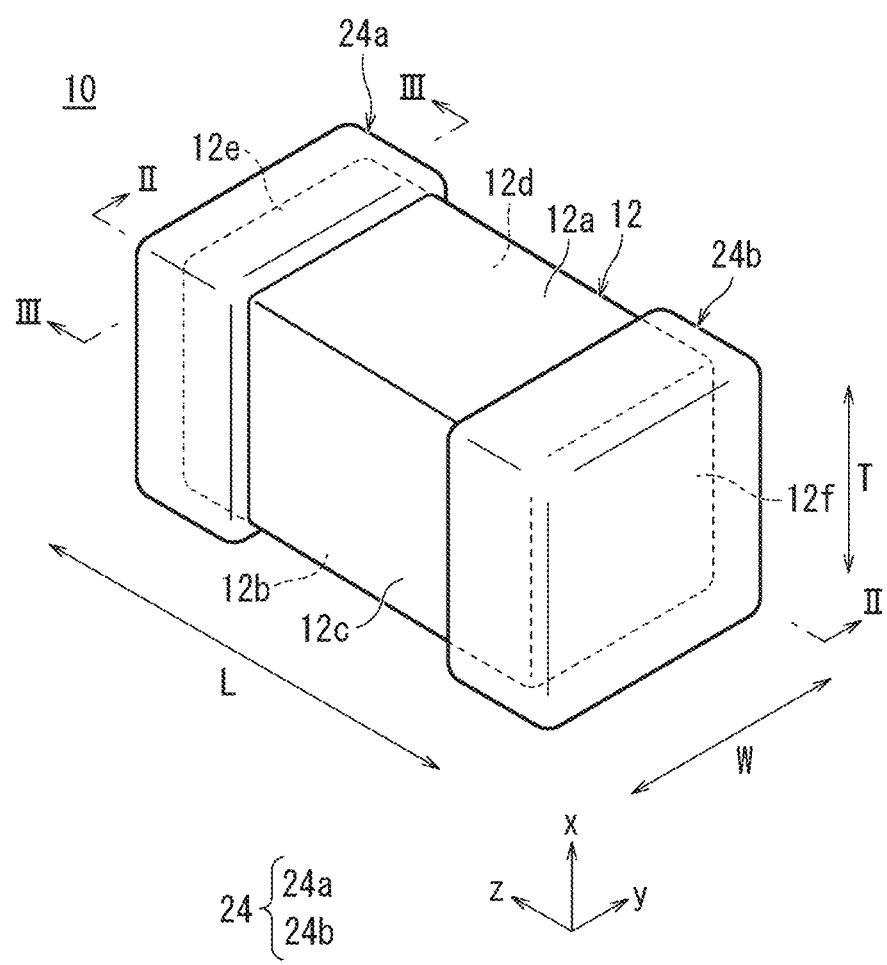
FIG. 1 is an outside perspective view of a multilayer ceramic capacitor according to a preferred embodiment of the present invention.
Figure 2:
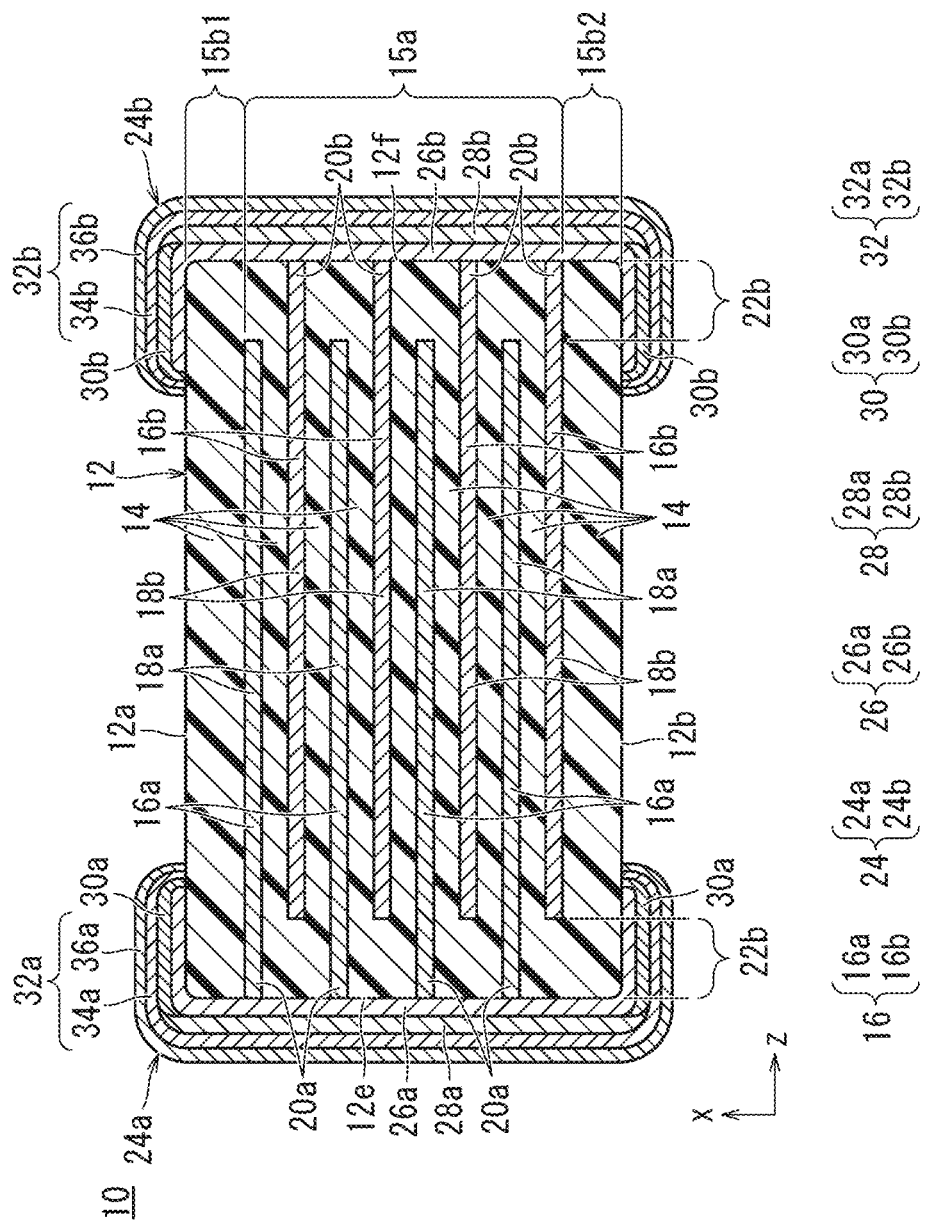
FIG. 2 is a cross-sectional view of a multilayer ceramic capacitor according to a preferred embodiment of the present invention, taken along line II-II of FIG. 1.
Figure 3:
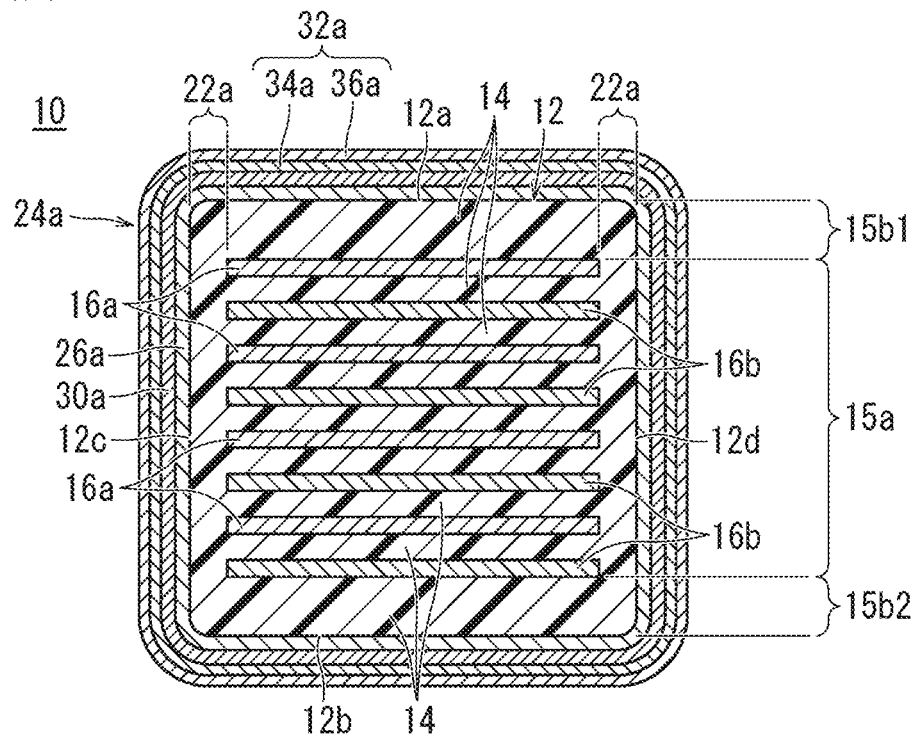
FIG. 3 is a cross-sectional view of a multilayer ceramic capacitor according to a preferred embodiment of the present invention, taken along line III-III of FIG. 1.
Figure 4:
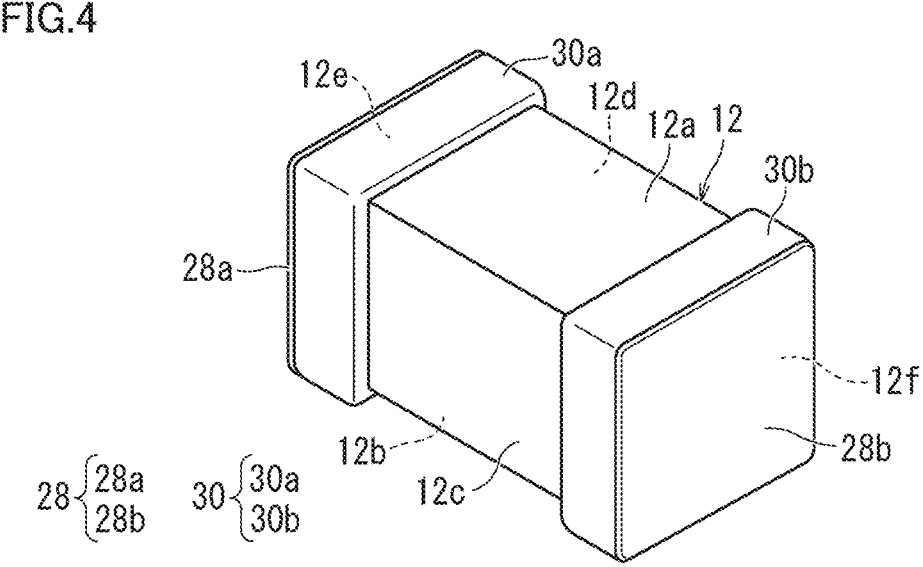
FIG. 4 is an outside perspective view showing a multilayer ceramic capacitor before the formation of a plating layer of external electrodes.

FIG. 1 is an outside perspective view showing a multilayer ceramic capacitor according to a first preferred embodiment of the present invention. FIG. 2 is a cross-sectional view taken along line II-II of FIG. 1, and FIG. 3 is a cross-sectional view taken along line III-III of FIG. 1. FIG. 4 is an outside perspective view showing a multilayer ceramic capacitor before the formation of a plating layer of external electrodes.

A multilayer ceramic capacitor 10 includes a rectangular or substantially rectangular parallelepiped stacked body 12 and two external electrodes 24.

(A) Stacked Body

Stacked body 12 includes a plurality of ceramic layers 14 and a plurality of internal electrode layers 16 which are stacked. Further, stacked body 12 includes a first main surface 12a and a second main surface 12b opposite to each other in stacking direction x, a first lateral surface 12c and a second lateral surface 12d opposite to each other in width direction y orthogonal or substantially orthogonal to stacking direction x, and a first end surface 12e and a second end surface 12f opposite to each other in length direction z orthogonal or substantially orthogonal to stacking direction x and width direction y. Stacked body 12 may have any dimension. Note that the dimension of stacked body 12 in length direction z is not necessarily greater than the dimension in width direction y.

The corners and ridge lines of stacked body 12 are preferably rounded. Each corner refers to an intersection of adjacent three planes of stacked body 12, and each ridge line refers to an intersection of adjacent two planes of stacked body 12. First and second main surfaces 12a, 12b, first and second lateral surfaces 12c, 12d, and first and second end surfaces 12e, 12f may include asperity, in a portion or in the entirety thereof.

(i) Ceramic Layer

As shown in FIGS. 2 and 3, stacked body 12 includes an effective layer portion 15a, a first outer layer portion 15b1, and a second outer layer portion 15b2. Effective layer portion 15a is a portion in which a plurality of internal electrode layers 16 face each other in stacking direction x, i.e., in the direction of a line connecting first and second main surfaces 12a, 12b. First outer layer portion 15b1 includes a plurality of ceramic layers 14 located between first main surface 12a and internal electrode layer 16 that is closest to first main surface 12a. Second outer layer portion 15b2 includes a plurality of ceramic layers 14 located between second main surface 12b and internal electrode layer 16 that is closest to second main surface 12b.

First outer layer portion 15b1, which is located adjacent to first main surface 12a of stacked body 12, includes a plurality of ceramic layers 14 located between first main surface 12a and internal electrode layer 16 that is closest to first main surface 12a.

Second outer layer portion 15b2, which is located adjacent to second main surface 12b of stacked body 12, includes a plurality of ceramic layers 14 located between second main surface 12b and internal electrode layer 16 that is closest to second main surface 12b.

Effective layer portion 15a is a region sandwiched between first outer layer portion 15b1 and second outer layer portion 15b2.

The dimensions of stacked body 12 are preferably, but are not limited to, for example, not less than about 0.2 mm and not more than about 10.0 mm in length direction z, not less than about 0.1 mm and not more than about 10.0 mm in width direction y, and not less than about 0.1 mm and not more than about 10.0 mm in height direction x.

The number of stacked ceramic layers 14 is preferably, but is not limited to, for example, not less than 10 and not more than 700.

Ceramic layers 14 may include, for example, a dielectric material. The dielectric material may be, for example, a dielectric ceramic including $BaTiO_3$, $CaTiO_3$, $SrTiO_3$, or $CaZrO_3$ as a primary component. With any of these dielectric materials included as a primary component, secondary components, less in content than the primary component, may be added in accordance with predetermined characteristics of stacked body 12. Examples of the secondary components include Mn compounds, Fe compounds, Cr compounds, Co compounds, and Ni compounds.

If piezoelectric ceramic material is used for ceramic layers 14, the multilayer ceramic electronic component defines and functions as a piezoelectric component. Specific examples of the piezoelectric ceramic material include lead zirconate titanate (PZT) ceramic material.

If semiconductor ceramic material is used for ceramic layers 14, the multilayer ceramic electronic component defines and functions as a thermistor. Specific examples of the semiconductor ceramic material include spinel ceramic material.

If magnetic ceramic material is used for ceramic layers 14, the multilayer ceramic electronic component defines and functions as an inductor. If the multilayer ceramic electronic component defines and functions as an inductor, internal electrode layers 16 define a coiled conductor. Specific examples of the magnetic ceramic material include ferrite ceramic material.

Each ceramic layer 14, after being fired, preferably has a thickness of not less than about 0.5 μm and not more than about 15 μm, for example.

(ii) Internal Electrode Layers

Stacked body 12 includes a plurality of first internal electrode layers 16a and a plurality of second internal electrode layers 16b, which are rectangular or substantially rectangular for example, as a plurality of internal electrode layers 16. The corners of the rectangle may be rounded or may be tapered or inclined. The plurality of first internal electrode layers 16a and the plurality of second internal electrode layers 16b are embedded and are alternated and equally spaced, with ceramic layers 14 being interposed therebetween, along stacking direction x of stacked body 12.

First internal electrode layers 16a include first facing electrode portions 18a and first leading electrode portions 20a. First facing electrode portions 18a face second internal electrode layers 16b. First leading electrode portions 20a are located at one end of first internal electrode layers 16a and lead from facing electrode portions 18a to first end surface 12e of stacked body 12. The end of each first leading electrode portion 20a is led to and exposed at first end surface 12e.

Second internal electrode layers 16b include second facing electrode portions 18b and second leading electrode portions 20b. Second facing electrode portions 18b face first internal electrode layers 16a. Second leading electrode portions 20b are located at one end of second internal electrode layers 16b and lead from second facing electrode portions 18b to second end surface 12f of stacked body 12. The end of each second leading electrode portion 20b is led to and exposed at second end surface 12f.

First and second facing electrode portions 18a, 18b may have the same or substantially the same width as, or may be larger or smaller in width than, first and second leading electrode portions 20a, 20b.

Figure 5A:
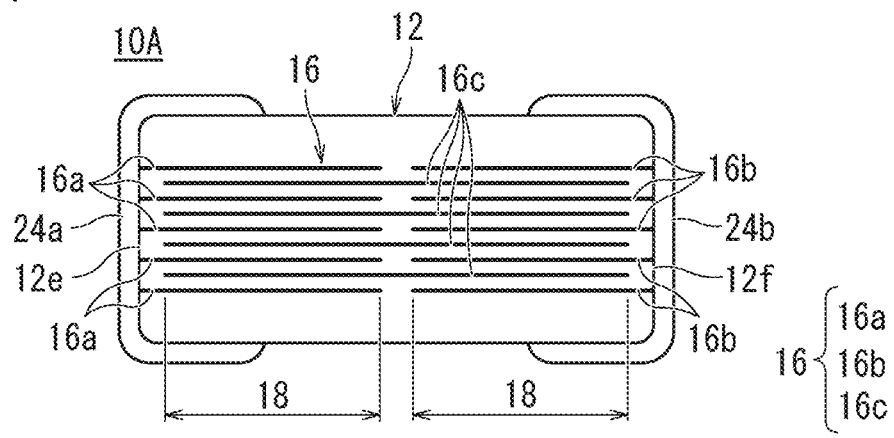
FIG. 5A is a schematic cross-sectional view showing a structure in which the facing electrode portions of the internal electrode layers of a multilayer ceramic capacitor are divided into two portions.
Figure 5B:
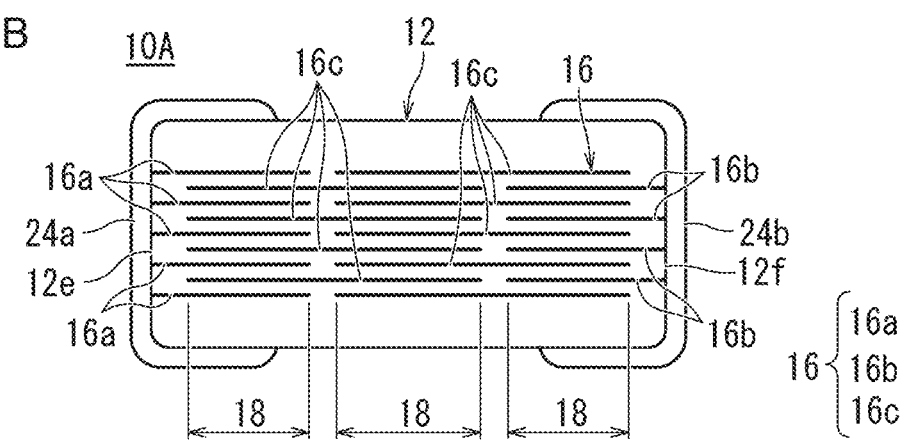
FIG. 5B is a schematic cross-sectional view showing a structure in which the facing electrode portions of the internal electrode layers of a multilayer ceramic capacitor are divided into three portions.
Figure 5C:
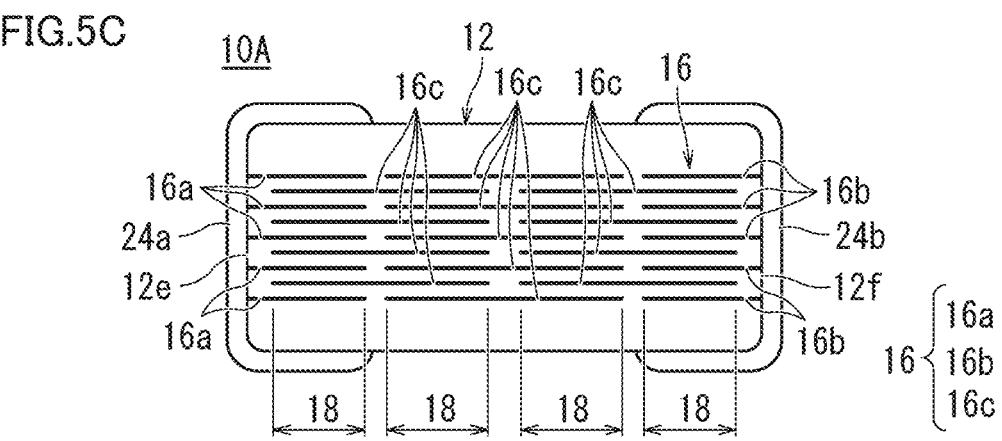
FIG. 5C is a schematic cross-sectional view showing a structure in which the facing electrode portions of the internal electrode layers of a multilayer ceramic capacitor are divided into four portions.

As shown in FIGS. 5A to 5C, internal electrode layers 16 may include not only first and second internal electrode layers 16a, 16b, but also floating internal electrode layers 16c that are not led to either first end surface 12e or second end surface 12f, where floating internal electrode layers 16c divide facing electrode portions 18 into a plurality of portions. For example, facing electrode portions 18 may include two portions as shown in FIG. 5A, three portions as shown in FIG. 5B, or four portions as shown in FIG. 5C. More than four portions are also possible. Facing electrode portions 18 being divided into a plurality of portions provides a plurality of capacitor components between internal electrode layers 16a, 16b, 16c that face each other, with these capacitor components being connected in series. Thus, a voltage applied per capacitor component is reduced, enabling multilayer ceramic capacitor 10A to withstand a higher voltage.

Stacked body 12 includes lateral portions ("W gaps") 22a between first lateral surface 12c and one end of first and second facing electrode portions 18a, 18b in width direction y, and between second lateral surface 12d and the other end of first and second facing electrode portions 18a, 18b in width direction y. Further, stacked body 12 includes end portions ("L gaps") 22b between second end surface 12f and the end of first internal electrode layers 16a opposite to first leading electrode portions 20a, and between first end surface 12e and the end of second internal electrode layers 16b opposite to second leading electrode portions 20b.

Internal electrode layers 16 may include an appropriate conductive material, such as, for example, a metal (e.g., Ni, Cu, Ag, Pd, or Au) or an alloy including at least one of these metals (e.g., Ag—Pd alloy). Internal electrode layers 16 may further include dielectric particles having the same or similar composition as the ceramic included in ceramic layers 14.

Each internal electrode layer 16 preferably has a thickness of not less than about 0.2 μm and not more than about 2.0 μm, for example. The number of internal electrode layers 16 is preferably not less than 10 and not more than 700, for example.

(B) External Electrodes

External electrodes 24 are provided on first and second end surfaces 12e, 12f of stacked body 12. External electrodes 24 include a first external electrode 24a and a second external electrode 24b.

First external electrode 24a covers first end surface 12e of stacked body 12 and extends from first end surface 12e to cover a portion of each of first main surface 12a, second main surface 12b, first lateral surface 12c, and second lateral surface 12d. In this case, first external electrode 24a is electrically connected to first leading electrode portions 20a of first internal electrode layers 16a.

Second external electrode 24b covers second end surface 12f of stacked body 12 and extends from second end surface 12f to cover a portion of each of first main surface 12a, second main surface 12b, first lateral surface 12c, and second lateral surface 12d. In this case, second external electrode 24b is electrically connected to second leading electrode portions 20b of second internal electrode layers 16b.

In stacked body 12, first facing electrode portions 18a of first internal electrode layers 16a and second facing electrode portions 18b of second internal electrode layers 16b face each other, with ceramic layers 14 being interposed therebetween, thus causing capacitance. This provides a capacitance between first external electrode 24a, to which first internal electrode layers 16a are connected, and second external electrode 24b, to which second internal electrode layers 16b are connected. The characteristics of a capacitor are thus provided.

First external electrode 24a includes a first underlying electrode layer 26a, a first resin electrode layer 28a, and a first resin layer 30a, and first metal layer 32a. First underlying electrode layer 26a includes a conductive metal and glass component. First resin electrode layer 28a includes a resin and metal component. First resin layer 30a includes a resin and no metal component.

Second external electrode 24b includes a second underlying electrode layer 26b, a second resin electrode layer 28b, and a second resin layer 30b, and second metal layer 32b. Second underlying electrode layer 26b includes a conductive metal and glass component. Second resin electrode layer 28b includes a resin and metal component. Second resin layer 30b includes a resin and no metal component.

(i) Underlying Electrode Layer

Underlying electrode layer 26 includes a first underlying electrode layer 26a and a second underlying electrode layer 26b.

First underlying electrode layer 26a covers first end surface 12e of stacked body 12 and extends from first end surface 12e to cover a portion of each of first main surface 12a, second main surface 12b, first lateral surface 12c, and second lateral surface 12d.

Second underlying electrode layer 26b covers second end surface 12f of stacked body 12 and extends from second end surface 12f to cover a portion of each of first main surface 12a, second main surface 12b, first lateral surface 12c, and second lateral surface 12d.

Underlying electrode layer 26 includes a conductive metal and glass component. The metal in underlying electrode layer 26 preferably includes at least one selected from Cu, Ni, Ag, Pd, Ag—Pd alloy, and Au, for example. The glass in underlying electrode layer 26 preferably includes at least one selected from B, Si, Ba, Mg, Al, and Li, for example.

Underlying electrode layer 26 may include a plurality of layers. Underlying electrode layer 26 is produced by applying a conductive paste including glass and metal to stacked body 12 and then baking it. The baking may be performed simultaneously with or after the firing of ceramic layers 14 and internal electrode layers 16.

Underlying electrode layer 26 preferably has a thickness of, for example, not less than about 2 μm and not more than about 220 μm on each of first and second end surfaces 12e, 12f, at the center or approximate center. In this case, the contact angle of solder to the plating of external electrode 24 will be an acute angle. Thus, when a stress is applied from the solder to the plating in thermal shock cycling, a larger proportion of the stress is a component parallel or substantially parallel to the plating plane. Accordingly, the occurrence of solder cracking is reduced. Underlying electrode layer 26 preferably has a thickness of, for example, not less than about 4 μm and not more than about 15 μm on each of first main surface 12a, second main surface 12b, first lateral surface 12c, and second lateral surface 12d, at the center or approximate center.

(ii) Resin Electrode Layer

Resin electrode layer 28 includes a first resin electrode layer 28a and a second resin electrode layer 28b. Resin electrode layer 28 includes a resin and metal component.

First resin electrode layer 28a is provided on the surface of first underlying electrode layer 26a on first end surface 12e. First resin electrode layer 28a is not provided on the surface of first underlying electrode layer 26a located on first and second main surfaces 12a, 12b and on first and second lateral surfaces 12c, 12d.

Second resin electrode layer 28b is provided on the surface of second underlying electrode layer 26b on second end surface 12f. Second resin electrode layer 28b is not provided on the surface of second underlying electrode layer 26b located on first and second main surfaces 12a, 12b and on first and second lateral surfaces 12c, 12d.

First resin electrode layer 28a may cover an end of first resin layer 30a (described later), and second resin electrode layer 28b may cover an end of second resin layer 30b (described later).

As a specific example of the resin included in resin electrode layer 28, any of various publicly known thermosetting resins may be used, such as epoxy resins, phenolic resins, urethane resins, silicone resins, and polyimide resins. Among these, epoxy resin is one of the more preferable resins due to its excellent heat resistance, moisture resistance, and adhesion. Resin electrode layer 28 preferably includes a curing agent as well as a thermosetting resin. If an epoxy resin is used as the base resin, the curing agent may be any of various publicly known compounds, such as, for example, phenolic compounds, amine compounds, acid anhydride compounds, and imidazole compounds.

First and second resin electrode layers 28a, 28b, which include a thermosetting resin, are more flexible than underlying electrode layer 26, which includes a plating layer or fired layer including metal and glass components. Resin electrode layer 28 therefore defines and functions as a buffer layer to reduce or prevent the cracking of multilayer ceramic capacitor 10 when the mounting board is subjected to bending stresses and multilayer ceramic capacitor 10 is subjected to physical impacts or shocks from thermal cycling.

As the metal included in resin electrode layer 28, Ag or Ag-containing alloy may preferably be used, for example. Metal powder coated with Ag may also be used, in which case Cu or Ni is preferably used as the metal powder. Oxidation-resistant Cu may also be used. A reason to use an Ag-coated metal is that it reduces the cost by including an inexpensive metal as a base material, while maintaining the characteristics of Ag.

The percentage by volume of the metal in the entire resin electrode layer 28 is preferably not less than about 35 vol % and not more than about 75 vol %, for example.

The metal included in resin electrode layer 28 may have any shape. The conductive filler (metallic powder) included in resin electrode layer 28 may be spherical and/or flat metal powder, and more preferably, a mixture of spherical and flat metal powders. The metal included in resin electrode layer 28 may have any average particle diameter. The conductive filler (metallic powder) included in resin electrode layer 28 may preferably have an average particle diameter of about not less than about 0.3 µm and not more than about 10 µm, for example.

The metal included in resin electrode layer 28 mainly contributes to the ability to carry electricity in the resin electrode layer. Specifically, when conductive fillers come into contact with each other, a current-carrying path is provided inside resin electrode layer 28.

Resin electrode layer 28 preferably has a thickness of, but is not limited to, not less than about 20 µm and not more than about 130 µm, for example.

(iii) Resin Layer

Resin layer 30 includes a first resin layer 30a and a second resin layer 30b. Resin layer 30 includes a resin and no metal component.

First resin layer 30a is connected to first resin electrode layer 28a and covers the surface of first underlying electrode layer 26a located on a portion of each of first main surface 12a, second main surface 12b, first lateral surface 12c, and second lateral surface 12d.

Second resin layer 30b is connected to second resin electrode layer 28b and covers the surface of second underlying electrode layer 26b located on a portion of each of first main surface 12a, second main surface 12b, first lateral surface 12c, and second lateral surface 12d.

Resin layer 30, which includes no metal component and is provided at a portion located on first and second main surfaces 12a, 12b and on first and second lateral surfaces 12c, 12d, reduces or prevents ion migration through the following mechanism. In the anode of external electrodes 24, resin layer 30 prevents Ag on the end surface from reacting with hydroxide ions attached to external electrode 24. Therefore, AgOH which contributes to migration is not generated. In the cathode, resin layer 30, which includes no Ag, does not allow electrons to move therein. Therefore, Ag ions, if any, do not cause the deposition of Ag on first and second main surfaces 12a, 12b and on first and second lateral surfaces 12c, 12d and do not form a starting point of an Ag dendrite deposit.

As a specific example of the resin included in resin layer 30, any of various publicly known thermosetting resins may be used, such as epoxy resins, phenolic resins, urethane resins, silicone resins, and polyimide resins. Among these, epoxy resin is one of the more preferable resins due to its excellent heat resistance, moisture resistance, and adhesion. Resin layer 30 preferably includes a curing agent as well as a thermosetting resin. If an epoxy resin is used as the base resin, the curing agent may be any of various publicly known compounds, such as phenolic compounds, amine compounds, acid anhydride compounds, and imidazole compounds, for example.

While the resin used for resin layer 30 is preferably a thermosetting resin, other types of resin may also be used, such as a room-temperature curable resin, a photo-curable resin, or an electron beam curable resin, for example.

Resin layer 30, provided at a portion located on first and second main surfaces 12a, 12b and on first and second lateral surfaces 12c, 12d, includes a resin and no metal component. Accordingly, resin layer 30 is more flexible than metal layer 32 and underlying electrode layer 26. Resin layer 30, which includes no metal component, has a high modulus of elasticity and is thus able to relax stresses when multilayer ceramic capacitor 10 is subjected to tensile stresses applied to external electrodes 24 or bending stresses due to the thermal expansion and contraction of a mounting board caused by thermal cycling at the time of mounting. Accordingly, the cracking of stacked body 12 is reduced or prevented.

The surface of first resin layer 30a adjacent to first end surface 12e may be covered with first resin electrode layer 28a. In other words, first resin electrode layer 28a may overlap with first resin layer 30a. Similarly, the surface of second resin layer 30b adjacent to second end surface 12f may be covered with second resin electrode layer 28b. In other words, second resin electrode layer 28b may overlap with second resin layer 30b.

In this case, first and second resin electrode layers 28a, 28b have an increased thickness at their corners and, thus, allow passage of an increased amount of current therethrough, so as to reduce the resistance at the corners. Therefore, the ESR is effectively reduced by the increase in the amount of current flowing through resin electrode layer 28, in a region from the corners to the end surfaces.

Resin layer 30 preferably has a thickness of, but is not limited to, not less than about 10 µm and not more than about 40 µm, for example.

(iv) Metal Layer

Metal layer 32 includes a first metal layer 32a and a second metal layer 32b.

First metal layer 32a covers the surface of first resin electrode layer 28a and the surface of first resin layer 30a. Specifically, first metal layer 32a covers first resin electrode layer 28a located on first end surface 12e, and covers first resin layer 30a located on first and second main surfaces 12a, 12b and on first and second lateral surfaces 12c, 12d.

Second metal layer 32b covers the surface of second resin electrode layer 28b and the surface of second resin layer 30b. Specifically, second metal layer 32b covers second resin electrode layer 28b located on second end surface 12f, and covers second resin layer 30b located on first and second main surfaces 12a, 12b and on first and second lateral surfaces 12c, 12d.

The metallic material of first and second metal layers 32a, 32b preferably includes at least one selected from Cu, Ni, Ag, Sn, Pd, Ag—Pd alloy, or Au, for example.

Each of first and second metal layers 32a, 32b may include a plurality of layers. First metal layer 32a preferably has a double-layer structure including, for example, a first Ni plating layer 34a and a first Sn plating layer 36a. Second metal layer 32b also preferably has a double-layer structure including, for example, a second Ni plating layer 34b and a second Sn plating layer 36b.

First and second Ni plating layers 34a, 34b protect resin electrode layer 28, resin layer 30, and underlying electrode layer 26 from being eroded by the mounting solder when multilayer ceramic capacitor 10 is mounted.

First and second Sn plating layers 36a, 36b have increased solder wettability, thus allowing easy mounting of multilayer ceramic capacitor 10.

Each metal layer 32 preferably has a thickness of not less than about 1 µm and not more than about 15 µm, for example.

Where the dimension of multilayer ceramic capacitor 10 in length direction z is denoted by L dimension, L dimension is preferably not less than about 0.2 mm and not more than about 10 mm, for example. Where the dimension of multilayer ceramic capacitor 10 in width direction y is denoted by W dimension, W dimension is preferably not less than about 0.1 mm and not more than about 10 mm, for example. Where the dimension of multilayer ceramic capacitor 10 in stacking direction x is denoted by T dimension, T dimension is preferably not less than about 0.1 mm and not more than about 10 mm, for example.

In multilayer ceramic capacitor 10 shown in FIG. 1, first external electrode 24a includes first resin layer 30a, which includes a resin and no metal component, at a portion located on first and second main surfaces 12a, 12b and on first and second lateral surfaces 12c, 12d. Second external electrode 24b includes second resin layer 30b, which includes a resin and no metal component, at a portion located on first and second main surfaces 12a, 12b and on first and second lateral surfaces 12c, 12d. Thus, in the anode of external electrodes 24, resin layer 30 prevents Ag on the end surface from reacting with hydroxide ions attached to external electrode 24. Therefore, AgOH which contributes to migration is not generated.

In the cathode of external electrodes 24, resin layer 30, which includes no Ag, does not allow electrons to move therein. Therefore, Ag ions, if any, do not cause the deposition of Ag on first and second main surfaces 12a, 12b and on first and second lateral surfaces 12c, 12d and do not form a starting point of an Ag dendrite deposit.

Resin layer 30 also reduces or prevents cracking of multilayer ceramic capacitor 10 shown in FIG. 1. This is because resin layer 30 is able to release stresses applied to the mounting board (the deformation of the mounting board) when multilayer ceramic capacitor 10 is subjected to stresses due to a drop impact or bending stresses due to the thermal expansion and contraction of a mounting board caused by thermal cycling.

Thus, multilayer ceramic capacitor 10 shown in FIG. 1 reduces or prevents ion migration while achieving a high resistance to cracking.

2. Method for Manufacturing Multilayer Ceramic Capacitor

Description will now be provided of a preferred embodiment of a method for manufacturing multilayer ceramic capacitor 10 in the first preferred embodiment having the structure as described above.

First, ceramic green sheets for producing ceramic layers 14, an internal-electrode conductive paste for producing internal electrode layers 16, and an external-electrode conductive paste for producing underlying electrode layer 26 of external electrodes 24 are prepared. The ceramic green sheets, the internal-electrode conductive paste, and the external-electrode conductive paste include organic binders and organic solvents, which may be any of publicly known organic binders and organic solvents.

The ceramic green sheets are printed with the internal-electrode conductive paste in a predetermined pattern, for example, so that an internal electrode pattern is formed on the ceramic green sheets. Any of publicly known methods may be used for printing the internal-electrode conductive paste, such as screen printing or gravure printing, for example.

Then, a predetermined number of ceramic green sheets for outer layer with no internal electrode pattern are stacked. On these sheets, ceramic green sheets with the internal electrode pattern printed thereon are stacked one after another. Further, a predetermined number of ceramic green sheets for outer layer are stacked. Thus, a mother stacked body is produced. The mother stacked body may be compressed in stacking direction x by, for example, hydrostatic pressing, where appropriate.

Then, the mother stacked body is cut into pieces having a predetermined shape and size, thus producing raw stacked body chips. At this time, the ridge lines and corners of each raw stacked body chip may be rounded by, for example, barrel polishing. Then, each raw stacked body chip that has been cut out is fired, thus producing stacked body 12. The temperature of firing the raw stacked body chip is preferably not less than about 900° C. and not more than about 1400° C., for example, depending on the materials of the ceramic and internal-electrode conductive paste.

Next, first and second external electrodes 24a, 24b are formed respectively on first and second end surfaces 12e, 12f of stacked body 12. Specifically, after stacked body 12 is fired, a paste for the underlying electrode layers including a conductive metal and glass component is applied by dipping to first and second end surfaces 12e, 12f of stacked body 12, and is then baked. Thus, first underlying electrode layer 26a of first external electrode 24a and second underlying electrode layer 26b of second external electrode 24b are produced. The baking temperature is preferably not less than about 700° C. and not more than about 900° C., for example.

Then, resin layer 30 is formed. Specifically, a resin-layer paste that includes a thermosetting resin and no metal component is applied, so that the resin-layer paste covers first underlying electrode layer 26a located on first and second main surfaces 12a, 12b and on first and second lateral surfaces 12c, 12d. Thus, first resin layer 30a is produced. Similarly, a resin-layer paste that includes a thermosetting resin and no metal component is applied, so that the resin-layer paste covers second underlying electrode layer 26b located on first and second main surfaces 12a, 12b and on first and second lateral surfaces 12c, 12d. Thus, second resin layer 30b is produced.

A roller may be used to apply the resin-layer paste. Alternatively, stacked body 12 may be dipped in the resin-layer paste, with its end surfaces being masked to avoid adherence of the resin-layer paste. The resin-layer paste is then heat-treated at a temperature of not less than about 200° C. and not more than about 550° C., for example, so that the resin-layer resin is thermally cured, thus forming resin layer 30.

The heat treatment may be performed in an air or $N_2$ atmosphere, for example, among which a $N_2$ atmosphere is more preferable.

In order to reduce or prevent the scattering of the resin-layer paste and the oxidation of the metal components, the oxygen concentration is preferably about 100 ppm or less, for example.

Then, resin electrode layer 28 is produced. Specifically, a conductive resin paste that includes a resin and metal component is applied, so that the conductive resin paste covers first underlying electrode layer 26a on first end surface 12e and covers a portion of the surface of first resin layer 30a located on first and second main surfaces 12a, 12b and on first and second lateral surfaces 12c, 12d. Thus, first resin electrode layer 28a is produced. Similarly, a conductive resin paste that includes a resin and metal component is applied, so that the conductive resin paste covers second underlying electrode layer 26b on second end surface 12f and covers a portion of the surface of second resin layer 30b located on first and second main surfaces 12a, 12b and on first and second lateral surfaces 12c, 12d. Thus, second resin electrode layer 28b is produced.

The conductive-resin-layer paste may be applied by dipping, for example. The conductive-resin-layer paste is then heat-treated at a temperature of not less than about 200° C. and not more than about 550° C., for example, so that the conductive-resin-layer paste is thermally cured, thus forming resin electrode layer 28.

The heat treatment is preferably performed under a $N_2$ atmosphere, for example.

In order to reduce or prevent the scattering of the conductive-resin-layer paste and the oxidation of the metal components, the oxygen concentration is preferably about 100 ppm or less, for example.

Next, metal layer 32 is produced so that it covers the surface of resin electrode layer 28 and the surface of resin layer 30. First metal layer 32a has a double-layer structure including first Ni plating layer 34a and first Sn plating layer 36a on first Ni plating layer 34a. Second metal layer 32b has a double-layer structure including second Ni plating layer 34b and second Sn plating layer 36b on second Ni plating layer 34b.

Electroless plating is used for plating. Electrolytic plating is difficult to use to form metal layer 32 on the surface of resin layer 30 because resin layer 30, which includes no metal component, cannot carry a current. Barrel plating is preferably used for plating.

Through the processes described above, multilayer ceramic capacitor 10 is manufactured.

3. Experimental Examples (A) Multilayer Ceramic Capacitors in Working Example

As a working example, multilayer ceramic capacitors 10 according to the first preferred embodiment described above were produced according to the above-described manufacturing method. Then, migration and cracking as a result of a substrate bending test were examined. The specifications of the capacitors in the working example are as follows.

Dimensions L×W×T: about 1.0 mm×about 0.5 mm×about 0.5 mm
Ceramic material: $BaTiO_3$
Capacitance: about 0.01 μF
Rated voltage: about 50 V
Structure of external electrodes
Underlying electrode layer
Material of underlying electrode layer: Electrode material including conductive metal (Cu) and glass component
Thickness of underlying electrode layer: about 30 μm (the thickest portion at the center of the end surfaces)
Thickness of first and second underlying electrode layers located on the first and second end surfaces, at the center in the height direction: about 30 μm
Thickness of first and second underlying electrode layers located on the first and second main surfaces and on the first and second lateral surfaces, at the center in the length direction: about 5 μm
Resin electrode layer
Material of resin electrode layer:
Metal filler: Ag
Resin: Epoxy (thermal curing temperature: about 230° C.)
Thickness of first and second resin electrode layers located on the first and second end surfaces, at the center in the height direction: about 28 μm
Resin layer
Material of resin layer:
Resin: Epoxy (thermal curing temperature: about 230° C.)
Thickness of first and second resin layers located on the first and second main surfaces and on the first and second lateral surfaces, at the center in the length direction: 8 μm
Metal layer
Double-layer structure including Ni and Sn plating layers
Thickness of Ni plating layer:
Thickness of first and second Ni plating layers located on the first and second end surfaces, at the center in the height direction: about 3 μm
Thickness of first and second Ni plating layers located on the first and second main surfaces and on the first and second lateral surfaces, at the center in the length direction: about 3 μm
Thickness of Sn plating layer:
Thickness of first and second Sn plating layers located on the first and second end surfaces, at the center in the height direction: about 4 μm
Thickness of first and second Sn plating layers located on the first and second main surfaces and on the first and second lateral surfaces, at the center in the length direction: about 4 μm As comparative examples 1 and 2, multilayer ceramic capacitors with no resin layer (i.e., a layer that contains no metal component) were prepared. In comparative examples 1 and 2, different metal components were used in the resin electrode layer. The detailed specifications of comparative examples 1 and 2 are shown below.

(B) Multilayer Ceramic Capacitors in Comparative Example 1

Figure 6:
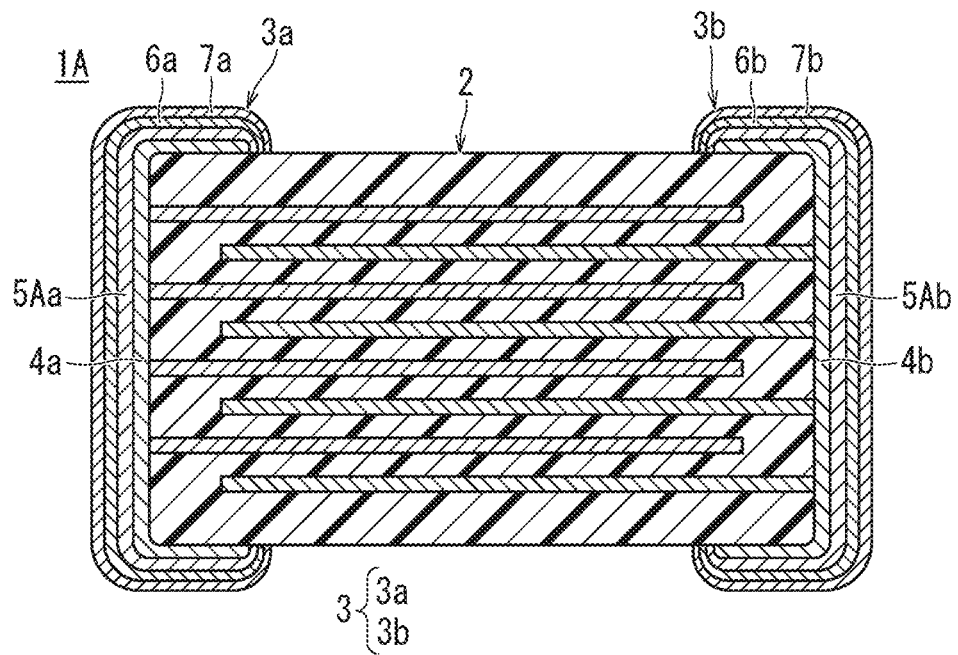
FIG. 6 is a cross-sectional view of a multilayer ceramic capacitor in a comparative example 1.

As comparative example 1, multilayer ceramic capacitors with no resin layer (i.e., a layer that contains no metal component) were produced. Then, migration and cracking as a result of a substrate bending test were examined. As shown in FIG. 6, a multilayer ceramic capacitor 1A in comparative example 1 includes a rectangular or substantially rectangular parallelepiped stacked body 2 and two external electrodes 3. External electrodes 3 include a first external electrode 3a and a second external electrode 3b. First external electrode 3a includes a first underlying electrode layer 4a, a first resin electrode layer 5Aa provided on first underlying electrode layer 4a, a first Ni plating layer 6a provided on first resin electrode layer 5Aa, and a first Sn plating layer 7a provided on first Ni plating layer 6a. Similarly, second external electrode 3b includes a second underlying electrode layer 4b, a second resin electrode layer 5Ab provided on second underlying electrode layer 4b, a second Ni plating layer 6b provided on second resin electrode layer 5Ab, and a second Sn plating layer 7b provided on second Ni plating layer 6b. First and second resin electrode layers 5Aa, 5Ab include Ag as a metal filler. The detailed specifications of the capacitors in comparative example 1 are as follows.

Dimensions L×W×T: about 1.0 mm×about 0.5 mm×about 0.5 mm
Ceramic material: $BaTiO_3$
Capacitance: about 0.01 μF
Rated voltage: about 50 V
Structure of external electrodes
Underlying electrode layer
Material of underlying electrode layer: Electrode material including conductive metal (Cu) and glass component
Thickness of underlying electrode layer: about 30 μm (the thickest portion at the center of the end surfaces)
Thickness of first and second underlying electrode layers located on the first and second end surfaces, at the center in the height direction: about 30 μm
Thickness of first and second underlying electrode layers located on the first and second main surfaces and on the first and second lateral surfaces, at the center in the length direction: about 5 μm
Resin electrode layer
Material of resin electrode layer:
Metal filler: Ag
Resin: Epoxy (thermal curing temperature: about 230° C.)
Thickness of first and second resin electrode layers located on the first and second end surfaces, at the center in the height direction: about 30 μm Thickness of first and second resin electrode layers located on the first and second main surfaces and on the first and second lateral surfaces, at the center in the length direction: about 10 μm Metal layer Double-layer structure including Ni and Sn plating layers Thickness of Ni plating layer:

Thickness of first and second Ni plating layers located on the first and second end surfaces, at the center in the height direction: about 3 μm Thickness of first and second Ni plating layers located on the first and second main surfaces and on the first and second lateral surfaces, at the center in the length direction: about 3 μm Thickness of Sn plating layer:

Thickness of first and second Sn plating layers located on the first and second end surfaces, at the center in the height direction: about 4 μm Thickness of first and second Sn plating layers located on the first and second main surfaces and on the first and second lateral surfaces, at the center in the length direction: about 4 μm C) Multilayer Ceramic Capacitors in Comparative Example 2

Figure 7:
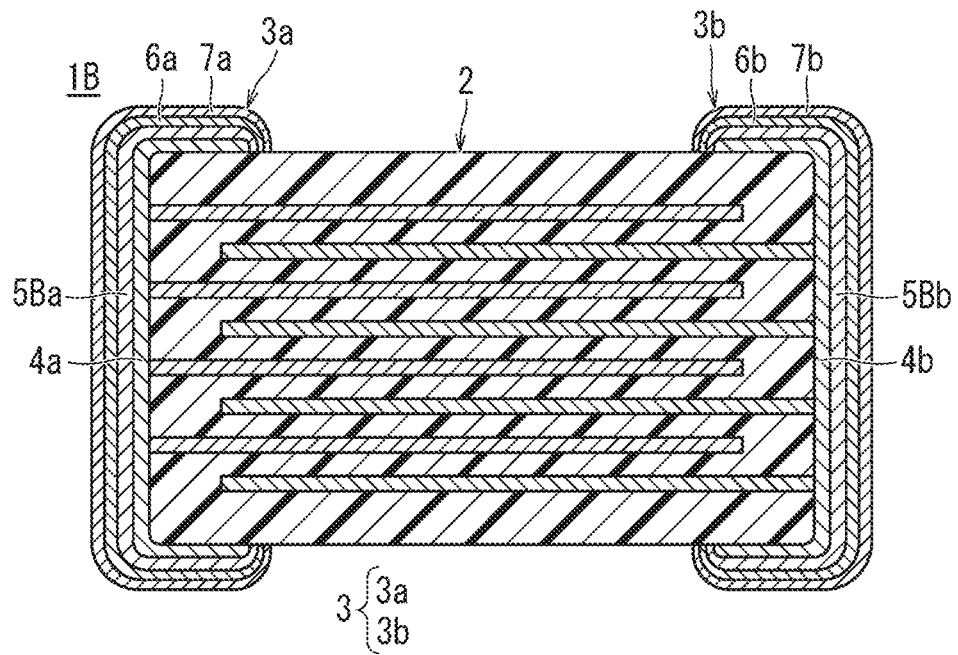
FIG. 7 is a cross-sectional view of a multilayer ceramic capacitor in a comparative example 2.

As comparative example 2, multilayer ceramic capacitors were produced including a thermosetting conductive resin layer between an underlying electrode layer and a plating layer. Then, migration and cracking as a result of a substrate bending test were examined. As shown in FIG. 7, a multilayer ceramic capacitor 1B in comparative example 2 includes a rectangular or substantially rectangular parallelepiped stacked body 2 and two external electrodes 3. External electrodes 3 include first external electrode 3a and second external electrode 3b. First external electrode 3a includes first underlying electrode layer 4a, a first resin electrode layer 5Ba provided on first underlying electrode layer 4a, first Ni plating layer 6a provided on first resin electrode layer 5Ba, and first Sn plating layer 7a provided on first Ni plating layer 6a. Similarly, second external electrode 3b includes second underlying electrode layer 4b, a second resin electrode layer 5Bb provided on second underlying electrode layer 4b, second Ni plating layer 6b provided on second resin electrode layer 5Bb, and second Sn plating layer 7b provided on second Ni plating layer 6b. First and second resin electrode layers 5Ba, 5Bb include Ag-coated Cu as a metal filler.

The detailed specifications of the capacitors in comparative example 2 are as follows.

Dimensions L×W×T: about 1.0 mm×about 0.5 mm×about 0.5 mm

Ceramic material: BaTiO$_3$

Capacitance: about 0.01 μF

Rated voltage: about 50 V

Structure of external electrodes

Underlying electrode layer

Material of underlying electrode layer: Electrode material including conductive metal (Cu) and glass component Thickness of underlying electrode layer: about 30 μm (the thickest portion at the center of the end surfaces)

Thickness of first and second underlying electrode layers located on the first and second end surfaces, at the center in the height direction: about 30 μm Thickness of first and second underlying electrode layers located on the first and second main surfaces and on the first and second lateral surfaces, at the center in the length direction: about 5 μm Resin electrode layer Material of resin electrode layer:

Metal filler: Ag-coated Cu

Resin: Epoxy (thermal curing temperature: about 200° C.)

Thickness of first and second resin electrode layers located on the first and second end surfaces, at the center in the height direction: about 30 μm Thickness of first and second resin electrode layers located on the first and second main surfaces and on the first and second lateral surfaces, at the center in the length direction: about 10 μm Metal layer Double-layer structure including Ni and Sn plating layers Thickness of Ni plating layer:

Thickness of first and second Ni plating layers located on the first and second end surfaces, at the center in the height direction: about 3 μm Thickness of first and second Ni plating layers located on the first and second main surfaces and on the first and second lateral surfaces, at the center in the length direction: about 3 μm Thickness of Sn plating layer:

Thickness of first and second Sn plating layers located on the first and second end surfaces, at the center in the height direction: about 4 μm Thickness of first and second Sn plating layers located on the first and second main surfaces and on the first and second lateral surfaces, at the center in the length direction: about 4 μm (D) Test Method (i) Method of Examining Migration A humidity load test was conducted for multilayer ceramic capacitor samples of the working example, comparative example 1, and comparative example 2 described above, under an environment of not less than about 90% RH and not more than about 95 RH %, at a temperature of about 85° C., and with a direct-current voltage of about 50 V applied. The test time was about 4000 hours. During the test, the insulation resistance value was measured. The number of samples was 36.

When the insulation resistance value was equal to or less than about $1 \times 10^6$ Ω and an Ag dendrite deposit was detected on the first and second main surfaces and on the first and second lateral surfaces, ion migration was determined to have occurred.

The detailed conditions of the humidity load test are as follows:

Measurement of insulation resistance

Equipment: Insulation resistance tester

Measurement time: about 60 seconds

External observation (observation of deposited dendrite)

Equipment: Metallurgical microscope

Field of view: Bright field

Magnification: 500-fold

External observation (observation of Ag)

Equipment: SEM-EDX

Electron image: Reflection electron

Accelerating voltage: about 15 kV

Magnification: 2000-fold

Element to be detected: Ag (ii) Method of Evaluating Cracking

Multilayer ceramic capacitor samples were mounted on a JEITA-land substrate having a thickness of about 1.6 mm using LF solder paste. The mounting was performed by reflowing under a peak temperature of about 250° C. Then, a mechanical stress was applied by bending the substrate using a pushing tool having a diameter of about 5 μm, from the side opposite to the capacitor-mounted face of the substrate. The stress was maintained for about 60 seconds, with the amount of deflection being about 17 mm.

After that, the multilayer ceramic capacitors were removed from the substrate and subjected to cross section polishing. The multilayer ceramic capacitors were then observed and examined for cracking. For each multilayer ceramic capacitor, the cross section polishing was performed in the direction of a line connecting the first and second lateral surfaces. Using a metallurgical microscope, cracking was examined in cross sections at three locations: at the location where the internal electrodes start to appear, at the center in the W dimension, and at the location where the internal electrodes disappear. The number of samples was 30.

(iii) Results of Evaluation

The results of the migration examination and the cracking evaluation are shown in table 1.

TABLE 1

|  | Migration (number of samples) | Cracking (number of samples) |
| --- | --- | --- |
| Working example | 0/36 | 0/30 |
| Comparative example 1 | 36/36 | 16/30 |
| Comparative example 2 | 10/36 | 15/30 |

Table 1 shows that the multilayer ceramic capacitors of the working example reduced the occurrence of ion migration. In the multilayer ceramic capacitors of the working example, a resin layer, which includes no metal component, is provided at a portion located on the first and second main surfaces and on the first and second lateral surfaces. Thus, in the anode of the external electrodes, the resin layer prevents Ag on the end surface from reacting with hydroxide ions attached to the external electrode. Therefore, AgOH which contributes to migration is not generated.

In the cathode, the resin layer, which includes no Ag, does not allow electrons to move therein. Therefore, Ag ions, if any, do not cause the deposition of Ag on the first and second main surfaces and on the first and second lateral surfaces and do not form a starting point of an Ag dendrite deposit. Thus, ion migration is reduced or prevented.

On the other hand, in comparative example 1, an Ag deposit was detected in all the samples.

In the samples of comparative example 1, a resin electrode layer, which includes Ag as a metal filler, is provided at a portion located on the first and second main surfaces and on the first and second lateral surfaces. In the anode of the external electrodes, Ag on the end surface reacts with hydroxide ions attached to the external electrode, thereby generating AgOH which contributes to migration. AgOH decomposes into silver oxide and colloidally moves to the cathode. The silver oxide ionizes, and emits and receives electrons, thus forming an Ag deposit.

In comparative example 2, an Ag deposit was detected (i.e., migration was detected) in 10 out of 36 samples.

In the samples of comparative example 2, a resin electrode layer, which includes Ag-coated Cu as a metal filler, is provided at a portion located on the first and second main surfaces and on the first and second lateral surfaces. Thus, migration occurs and Ag is deposited by the same mechanism as that of comparative example 1.

No cracking was found in the multilayer ceramic capacitors of the working example. This is due to the resin layer provided at a portion located on the first and second main surfaces and on the first and second lateral surfaces. The resin layer, which includes no metal component and thus has a high modulus of elasticity, is able to relax stresses and reduce or prevent cracking.

On the other hand, in the multilayer ceramic capacitors of comparative examples 1 and 2, cracking was found in some of the samples. In comparative examples 1 and 2, each external electrode includes a resin electrode layer, which includes a resin and metal component. Such a resin electrode layer, when subjected to bending stresses, cannot release the stresses applied to the mounting board (the deformation of the mounting board) as effectively as the resin layer of the working example.

Preferred embodiments of the present invention are not limited to the preferred embodiments disclosed above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a stacked body including:
        a plurality of ceramic layers and a plurality of internal electrode layers which are stacked;
        a first main surface and a second main surface opposite to each other in a stacking direction;
        a first end surface and a second end surface opposite to each other in a length direction orthogonal or substantially orthogonal to the stacking direction; and
        a first lateral surface and a second lateral surface opposite to each other in a width direction orthogonal or substantially orthogonal to the stacking direction and the length direction;
    a first external electrode provided on the first end surface; and
    a second external electrode provided on the second end surface; wherein the first external electrode includes:
        a first underlying electrode layer including a conductive metal;
        a first resin electrode layer including a resin and metal component;
        a first resin layer including a resin and no metal component; and
        a first metal layer including plating;
    the second external electrode includes:
        a second underlying electrode layer including a conductive metal;
        a second resin electrode layer including a resin and metal component;
        a second resin layer including a resin and no metal component; and
        a second metal layer including plating;
    the first underlying electrode layer covers the first end surface and extends from the first end surface to cover a portion of each of the first main surface, the second main surface, the first lateral surface, and the second lateral surface;
    the second underlying electrode layer covers the second end surface and extends from the second end surface to cover a portion of each of the first main surface, the second main surface, the first lateral surface, and the second lateral surface;

the first resin electrode layer is provided on the first underlying electrode layer located on the first end surface;

the second resin electrode layer is provided on the second underlying electrode layer located on the second end surface;

the first resin layer is connected to the first resin electrode layer and is provided on the first underlying electrode layer located on a portion of each of the first main surface, the second main surface, the first lateral surface, and the second lateral surface;

the second resin layer is connected to the second resin electrode layer and is provided on the second underlying electrode layer located on a portion of each of the first main surface, the second main surface, the first lateral surface, and the second lateral surface;

the first metal layer covers a surface of the first resin electrode layer and a surface of the first resin layer; and the second metal layer covers a surface of the second resin electrode layer and a surface of the second resin layer.

2. The multilayer ceramic electronic component according to claim 1, wherein the conductive metal in each of the first resin electrode layer and the second resin electrode layer is Ag.

3. The multilayer ceramic electronic component according to claim 1, wherein each of the first metal layer and the second metal layer includes a Ni plating layer and a Sn plating layer.

4. The multilayer ceramic electronic component according to claim 1, wherein corners and ridge lines of the stacked body are rounded.

5. The multilayer ceramic electronic component according to claim 1, wherein the stacked body includes a first outer layer portion, a second outer layer portion, and an effective layer portion disposed between the first and second outer layer portions.

6. The multilayer ceramic electronic component according to claim 5, wherein
the first outer layer portion includes ceramic layers of the plurality of ceramic layers located between the first main surface and an internal electrode layer of the plurality of internal electrode layers closest to the first main surface; and
the second outer layer portion includes ceramic layers of the plurality of ceramic layers located between the second main surface and an internal electrode layer of the plurality of internal electrode layers closest to the second main surface.

7. The multilayer ceramic electronic component according to claim 1, wherein the stacked body has a dimension in the length direction of not less than about 0.2 mm and not more than about 10.0 mm, a dimension in the width direction of not less than about 0.1 mm and not more than about 10.0 mm, and a dimension in the stacking direction of not less than about 0.1 mm and not more than about 10.0 mm.

8. The multilayer ceramic electronic component according to claim 1, wherein a number of the plurality of ceramic layers in not less than 10 and not more than 700.

9. The multilayer ceramic electronic component according to claim 1, wherein each of the plurality of ceramic layers includes at least one of $BaTiO_3$, $CaTiO_3$, $SrTiO_3$, or $CaZrO_3$ as a primary component.

10. The multilayer ceramic electronic component according to claim 9, wherein each of the plurality of ceramic layers further includes at least one of a Mn compound, a Fe compound, and Cr compound, a Co compound, and a Ni compound as a secondary component.

11. The multilayer ceramic electronic component according to claim 1, wherein each of the plurality of internal electrode layers includes at least one of Ni, Cu, Ag, Pd, and Au, or an alloy including at least one of Ni, Cu, Ag, Pd, and Au.

12. The multilayer ceramic electronic component according to claim 1, wherein each of the plurality of internal electrode layers has a thickness of not less than about 0.2 μm and not more than about 2.0 μm.

13. The multilayer ceramic electronic component according to claim 1, wherein a number of the plurality of internal electrode layers is not less than 10 and not more than 700.

14. The multilayer ceramic electronic component according to claim 1, wherein the conductive metal of each of the first and second underlying electrode layers includes at least one of Cu, Ni, Ag, Pd, Ag—Pd alloy, and Au.

15. The multilayer ceramic electronic component according to claim 1, wherein each of the first and second underlying electrode layers includes a glass component.

16. The multilayer ceramic electronic component according to claim 15, wherein the glass component in each of the first and second underlying electrode layers includes at least one of B, Si, Ba, Mg, Al, and Li.

17. The multilayer ceramic electronic component according to claim 1, wherein the resin in each of the first and second resin electrode layers includes at least one of an epoxy resin, a phenolic resin, a urethane resin, a silicone resin, and a polyimide resin.

18. The multilayer ceramic electronic component according to claim 17, wherein the resin in each of the first and second resin electrode layers is an epoxy resin.

19. The multilayer ceramic electronic component according to claim 1, wherein a percentage by volume of the metal component in each of the first and second resin electrode layers is not less than about 35 vol % and nor more than about 75 vol %.

20. The multilayer ceramic electronic component according to claim 1, wherein the metal component in each of the first and second resin electrode layers includes a mixture of spherical and flat metal powders.

* * * * *